(12) United States Patent
Zhu et al.

(10) Patent No.: US 10,507,427 B2
(45) Date of Patent: Dec. 17, 2019

(54) FLUE OZONE DISTRIBUTOR APPLIED IN LOW-TEMPERATURE OXIDATION DENITRIFICATION TECHNOLOGY AND ARRANGEMENT MANNER THEREOF

(71) Applicants: INSTITUTE OF PROCESS ENGINEERING, CHINESE ACADEMY OF SCIENCES, Beijing (CN); BEIJING ZSTC ENVIRONMENTAL ENGINEERING CO., LTD., Beijing (CN)

(72) Inventors: Tingyu Zhu, Beijing (CN); Wenqing Xu, Beijing (CN); Ruizhuang Zhao, Beijing (CN); Wen Liu, Beijing (CN)

(73) Assignees: INSTITUTE OF PROCESS ENGINEERING, CHINESE ACADEMY OF SCIENCES (CN); BEIJING ZSTC ENVIRONMENTAL ENGINEERING CO., LTD. (CN)

( * ) Notice: Subject to any disclaimer, the term of this patent is extended or adjusted under 35 U.S.C. 154(b) by 298 days.

(21) Appl. No.: 15/121,795

(22) PCT Filed: Apr. 1, 2014

(86) PCT No.: PCT/CN2014/074548
§ 371 (c)(1),
(2) Date: Aug. 26, 2016

(87) PCT Pub. No.: WO2015/127707
PCT Pub. Date: Sep. 3, 2015

(65) Prior Publication Data
US 2017/0014761 A1  Jan. 19, 2017

(30) Foreign Application Priority Data
Feb. 26, 2014 (CN) ............................ 201410066906

(51) Int. Cl.
*B01D 53/76* (2006.01)
*B01F 5/06* (2006.01)
(Continued)

(52) U.S. Cl.
CPC ............. *B01D 53/76* (2013.01); *B01D 53/56* (2013.01); *B01F 3/02* (2013.01); *B01F 5/0415* (2013.01);
(Continued)

(58) Field of Classification Search
CPC .. B01D 53/76; B01D 53/56; B01D 2251/104; B01D 2258/025; B01D 2259/122;
(Continued)

(56) References Cited

U.S. PATENT DOCUMENTS 4,950,473 A * 8/1990 Flockenhaus .......... B01D 53/56
422/62
5,513,982 A * 5/1996 Althaus ................. B01F 5/0451
431/182
(Continued)

FOREIGN PATENT DOCUMENTS

CN    1872398 A    12/2006
CN    201244479 Y   5/2009
(Continued)

OTHER PUBLICATIONS

Abstract of CN 1872398 A, Dec. 6, 2006.
(Continued)

*Primary Examiner* — Charles Cooley
(74) *Attorney, Agent, or Firm* — McDonald Hopkins LLC

(57) ABSTRACT

A flue ozone distributor applied in a low-temperature oxidation denitrification technology and an arrangement manner thereof is disclosed. The flue ozone distributor comprises a distribution main pipe, multiple distribution branch pipes, Venturi distributors and delta wings. The distribution branch
(Continued)

pipes are led out from the distribution main pipe as parallel branches. The Venturi distributors are arranged with an equal space on the distribution branch pipes. The delta wings are arranged on one diffusion segment side of the Venturi distributors. The flue ozone distributor is arranged in the flue. The technology is used in the field of denitrification for flue gas of an industrial boiler/kiln by a low-temperature ozone oxidation method. The ozone-injecting direction is consistent with a flow direction of the flue gas. A soot deposit congestion problem does not exist. A turbulent flow behavior of the flue gas and ozone is strengthened. The oxidation efficiency is improved.

15 Claims, 3 Drawing Sheets

(51) Int. Cl.
  B01F 5/04 (2006.01)
  B01D 53/56 (2006.01)
  B01F 3/02 (2006.01)
(52) U.S. Cl.
  CPC .......... B01F 5/0451 (2013.01); B01F 5/0456 (2013.01); B01F 5/0461 (2013.01); B01F 5/0618 (2013.01); *B01D 2251/104* (2013.01); *B01D 2258/025* (2013.01); *B01D 2259/122* (2013.01); *B01F 2005/0433* (2013.01); *B01F 2215/0036* (2013.01)
(58) Field of Classification Search
  CPC .... B01F 5/0618; B01F 5/0456; B01F 5/0451; B01F 5/0461; B01F 5/0415; B01F 3/02; B01F 2215/0036; B01F 2005/0433
  See application file for complete search history.

(56) References Cited

U.S. PATENT DOCUMENTS

| 2002/0017731 A1* | 2/2002 | Ruscheweyh ......... B01F 5/0451 261/79.2 |
| 2002/0020076 A1* | 2/2002 | Ruscheweyh ......... B01F 5/0618 34/61 |
| 2002/0036951 A1* | 3/2002 | Brunet .................. B01F 5/0618 366/337 |
| 2005/0190643 A1* | 9/2005 | Hansen ................. B01F 5/0451 366/181.5 |
| 2018/0147529 A1* | 5/2018 | Yano .................... B01F 5/0641 |

FOREIGN PATENT DOCUMENTS

| CN | 101879401 A | 11/2010 | |
| CN | 201669061 U | 12/2010 | |
| CN | 202860407 U | 4/2013 | |
| GB | 1000941 A * | 8/1965 | ........... B01F 5/0618 |
| JP | 10-57768 A | 3/1998 | |
| JP | 2000-279765 A | 10/2000 | |
| WO | WO-2015127707 A1 * | 9/2015 | ........... B01D 53/76 |

OTHER PUBLICATIONS

Abstract of CN 101879401 A, Nov. 10, 2010.
Abstract of CN 201244479 Y, May 27, 2009.
Abstract of CN 201669061 U, Dec. 15, 2010.
Abstract of CN 202860407 U, Apr. 10, 2013.
Abstract of JP 10-57768 A, Mar. 3, 1998.
Abstract of JP 2000-279765 A, Oct. 10, 2000.
International Search Report, PCT/CN2014/074548, dated Nov. 26, 2014.

* cited by examiner

FLUE OZONE DISTRIBUTOR APPLIED IN LOW-TEMPERATURE OXIDATION DENITRIFICATION TECHNOLOGY AND ARRANGEMENT MANNER THEREOF

CROSS-REFERENCE TO RELATED APPLICATION

This application is a 35 U.S.C. 371 national stage filing of PCT Application No. PCT/CN2014/074548, filed on Apr. 1, 2014, which claims priority to Chinese Patent Application No. 201410066906.3, filed on Feb. 26, 2014, both of which are incorporated herein in their entirety by reference.

TECHNICAL FIELD

The present invention relates to a flue ozone distributor applied in a low-temperature oxidation denitrification technology and an arrangement manner thereof, which belongs to the field of environment engineering technology.

BACKGROUND ART

Pollutants in the flue gas discharged by industries such as pyroelectricity, steel and the like are of many and varied kinds. Purification devices for the flue gas existing in enterprises are mostly directed to governance in $SO_2$. As a major air pollutant, NO also impairs human health, environment, ecology and social economic seriously. Emission standards for flue gas in pyroelectricity, steel and the like that issued have proposed strict demand for the emission of $NO_R$. $NO_2$ and $SO_2$ have similar properties, being acid gases and easy to combine and react with alkaline substances to achieve the purpose of being removed. Since more than 90% of NO in the flue gas is NO, it needs to oxidize NO into $NO_2$ first. There has been a variety of oxidation removal technologies. For example, CN 1923337A discloses a device and a method for ozonization and simultaneous elimination of the multipollutant in boiler smoke gas, wherein the solution of the oxidation and elimination is injecting ozone on the flue of the boiler and then feeding the flue gas treated by ozone into an alkali washing tower to wash. For example, the prior application of the present inventor (CN201310482358.8) relates to a combined desulfuration, denitration, and mercury removal apparatus and method using a semidry process in a circulating fluidized bed (CFB), wherein the solution of the elimination is injecting ozone on the flue before the CFB purification device and then feeding the flue gas treated by ozone into the CFB device to carry out removal reaction. Note that the decomposition rate of $O_3$ becomes strengthened at a temperature higher than 150° C.; therefore, the temperature of the flue gas should not be too high.

Currently, the low-temperature ozonation denitration technology has some advantages in view of removal effect, cost of investment and operating, and becomes a focus in controlling $NO_x$ emission concerned by relevant industry or enterprise.

The low-temperature ozonation denitration technology refers to, prior to the flue gas entering into the purification device, injecting ozone into the flue to oxidize NO into $NO_2$ and then entering into subsequent absorbing process. The contacting effect of $O_3$ in the flue and NO in the flue gas directly determines the oxidation efficiency and subsequent absorption effect. Thus, a mixing effect of the two gases becomes a key point for the development of the technology, and accordingly, it becomes a hot spot for the development of the ozone distributor which affects the distribution of the flue gas.

The development of the ozone distributor may learn from the application experience of ammonia injection grid within the former-flue in the denitrification SCR technology reactor device. A main role of the ammonia injection grid is to promote the mixing uniformity of the injected ammonia or ammonia-containing air with the flue gas prior to contacting with the SCR catalyst, and thus improves the reaction efficiency on the SCR catalyst. It is reported that nozzle congestion, low mixing uniformity and the like are common problems during actual application of the ammonia injection grid. For this reason, some specific ammonia injection grids have been developed, for example, the anti-blocking ammonia injection grid disclosed in CN 103480254A and dynamic ammonia injection grid disclosed in CN 203208900U. The key point to design ozone distributor needs to solve the problem of poor mixing effect of the gas flow in laminar flow state and shorten the distance of the flue, wherein oxidation reaction takes place.

SUMMARY OF THE INVENTION

The purpose of the present invention is to provide a flue ozone distributor applied in a low-temperature oxidation denitrification technology and an arrangement manner thereof with regard to the design key point mentioned above, which realizes the best uniform mixing between ozone and flue gas within a short time in the project and ensures oxidation efficiency of NO in the flue.

In order to achieve this purpose, the present invention employs the following technical solutions:

One of the objects of the present invention is to provide a flue ozone distributor, the flue ozone distributor comprises a distribution main pipe, multiple distribution branch pipes, multiple Venturi distributors and multiple delta wings; wherein the multiple distribution branch pipes are led out from the distribution main pipe as parallel branches; the multiple Venturi distributors are arranged with an equal space on the distribution branch pipe; the delta wings are arranged on one diffusion segment side of the Venturi distributors.

The flue ozone distributor of the present invention employs a structure formed by combining the Venturi distributors with the delta wings, which can strengthen a turbulent flow behavior of flue gas and ozone in the application; promote efficiency of the oxidation; and shorten a flue distance of a valid reaction. An application advantage in an actual project is very obvious. The multiple distribution branch pipes lead out from the distribution main pipe as parallel branches, and the Venturi distributors arranged with equal spacings make distribution of the ozone in the flue more uniform and further ensure the mixing effect of the ozone and the flue gas.

Those skilled in the art may select specific form and size of each component according to actual needs. Spacing among distribution branch pipes, Venturi distributors, and delta wings may be chosen according to actual needs as well. The present invention does not make special regulations on the material of each component.

The following is a preferred form of the flue ozone distributor of the present invention and should not be construed as a limitation to the present invention.

The distribution branch pipe is divided into two segments; the front distribution branch pipe segment is led out from the distribution main pipe and is connected to the back distribution branch pipe segment through a connecting flange. As such, a building block design and installation are achieved; installation and maintenance are convenient.

A control valve is arranged on the front distribution branch pipe. As such, the amount of the introduced ozone may be adjusted depending on the concentration of NO in the flue gas in actual operation.

Spacing between the adjacent distribution branch pipes is equal. Preferably, spacing between the adjacent branch pipes is 300-500 mm, for example, 300.02-499 mm, 310-482 mm, 328-450 mm, 350-427.5 mm, 385 mm etc. may be selected.

Gas velocity in the distribution main pipes is not greater than 30 m/s, preferably 25-27 m/s. Gas velocity in the distribution branch pipes is controlled to be 20-25 m/s, for example, 20.03-24.8 m/s, 21-23.4 m/s, 21.5-23 m/s, 22.8 m/s etc. may be selected, and 20 m/s is preferred. In the present invention, selection of pipe diameters of the distribution main pipe and the distribution branch pipe is determined according to the gas velocity in the pipes.

Spacing between the adjacent Venturi distributors is 50-100 mm, for example, 50.02-99.8 mm, 56-90 mm, 68-81.5 mm, 73-79 mm, 75.4 mm etc. may be selected, and 50-75 mm is preferred.

The Venturi distributor has a shrink angle of 70-90°, for example, 70.01-88.9°, 73-86.4°, 76.4-82°, 77-80°, 79.4° etc. may be selected, and 80° is preferred.

The Venturi distributor has a diffusion angle of 25-50°, for example, 23-45.3°, 26.4-42.3°, 28-40°, 30.5-37°, 33.7° etc. may be selected, and 40° is preferred.

The ratio of height to diameter at the throat of the Venturi distributor is 1.0-1.5, for example, 1.01-1.48, 1.08-1.41, 1.2-1.34, 1.23-1.3, 1.27 etc. may be selected, and 1.2 is preferred.

Gas velocity at the throat of the Venturi distributor is 8-12 m/s, for example, 8.02-11.8 m/s, 8.6-11.3 m/s, 9-10.7 m/s, 9.6 m/s etc. may be selected, and 12 m/s is preferred.

The vertical distance between the diffusion segment of the Venturi distributor and the corresponding delta wing is 8-12 cm, for example, 8.01-11.8 cm, 8.8-11.2 cm, 9.4-10.7 cm, 10 cm etc. may be selected, and 10 cm is preferred.

The delta wing on adjacent distributor branch pipes has a tilt angle of 90°. This design can increase the distribution region of the ozone, and strengthen the mixing effect of the ozone and the flue gas.

The delta wing has a section of an equilateral triangle, of which a diameter of the inscribed circle is 1.1-1.5 and preferably 1.2-1.3 times of the outlet diameter of the diffusion segment of the Venturi distributor.

The delta wing and the Venturi distributor are connected by a clamp which is integrated with the delta wing. The clamp is stuck at the throat segment of the Venturi distributor. The delta wing conducts disturbance on the ozone injected from the Venturi distributor.

The second object of the invention is to provide an arrangement manner of the flue ozone distributor as described above, when the flue ozone distributor is arranged in the flue, a horizontal distance between the end of the distribution branch pipe and side wall of the flue is of ½ width of the flue, an even number of groups of the flue ozone distributors are symmetrically installed in dislocation on both sides of the flue; the injected direction of the ozone through the flue ozone distributor is consistent with the flow direction of the flue gas.

The third object of the invention is to provide a flue, the above flue ozone distributor is arranged in the flue. The ozone is injected into the flue through the flue ozone distributor and mixed sufficiently with the flue gas in the flue, oxidizing NO therein into $NO_2$ and then entering into a subsequently purification process.

The horizontal distance between the end of the distribution branch pipe and side wall of the flue is of ½ width of the flue, and an even number of groups of flue ozone distributors are symmetrically installed in dislocation on both sides of the flue. As such, the pressure required by the single ozone distributor is reduced, while the distribution uniformity of the ozone in the flue is strengthened.

The injected direction of the ozone through the flue ozone distributor is consistent with the flow direction of the flue gas. As such, a soot deposit congestion problem is avoided.

Compared with the prior art, the present invention has the following advantageous effects:

1. The flue ozone distributor of the present invention employs a structure of combining the Venturi distributor with the delta wing. The Venturi structure increases the surface covered by the ozone distribution. The delta wing further conducts disturbance, which enhances the mixing effect of the flue gas and the ozone, and promotes the oxidation reaction.

2. A direction of the ozone injected by the flue ozone distributor is consistent with a flow direction of the flue gas. As such, a soot deposit congestion problem does not exist.

3. The distribution branch pipe is divided into two segments, one segment is led out from the distribution main pipe and the two segments are connected by a flange. The delta wing and the Venturi distributor are of a fixed connection by a clamp. The structure is simple. Installation and maintenance are convenient.

Figure 1:
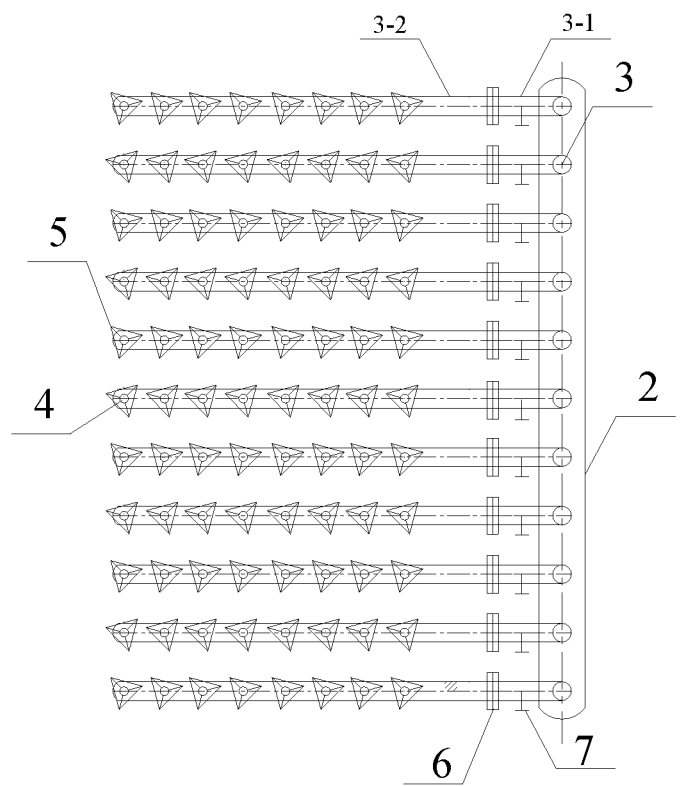
FIG. 1 is a front view schematic of the flue ozone distributor structure of the present invention.

Reference numbers for each part in the drawings are as follows: 1—flue; 2—distribution main pipe; 3—distribution branch pipe; 3-1—front distribution branch pipe; 3-2—back distribution branch pipe; 4—Venturi distributor; 5—delta wing; 6—connecting flange; 7—control valve.

Hereinafter, the present invention is described in further detail. However, the following examples are merely simple examples of the present invention; they do not represent or limit the protection scope of the present invention. The protection scope of the present invention is defined by the appending claims.

EMBODIMENTS

The technical solution of the present invention is illustrated by specific embodiments in conjunction with the drawings.

In order to illustrate the present invention better and to facilitate understanding the technical solutions of the present invention, typical but non-limiting embodiments of the present invention are as follows:

Example 1

A flue ozone distributor, the flue ozone distributor comprises a distribution main pipe, multiple distribution branch pipes, multiple Venturi distributors and multiple delta wings; the multiple distribution branch pipes are led out from the distribution main pipe as parallel branches; the multiple Venturi distributors are arranged with an equal space on the distribution branch pipe; the delta wings are arranged on one diffusion segment side of the Venturi distributor.

When the flue ozone distributor is arranged in the flue, the horizontal distance between the end of the distribution branch pipe and side wall of the flue is of ½ width of the flue, an even number of groups of flue ozone distributors are symmetrically installed in dislocation on both sides of the flue; the injected direction of the ozone through the flue ozone distributor is consistent with the flow direction of the flue gas.

Example 2

Figure 2:
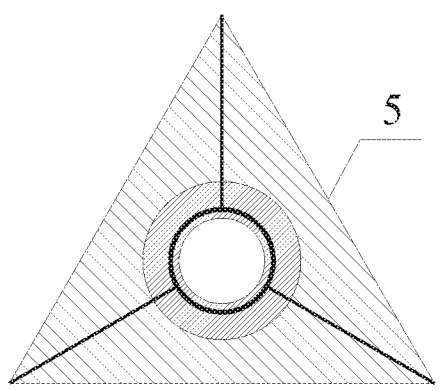
FIG. 2 is a structure schematic of the delta wing in the flue ozone distributor of the present invention.
Figure 3:
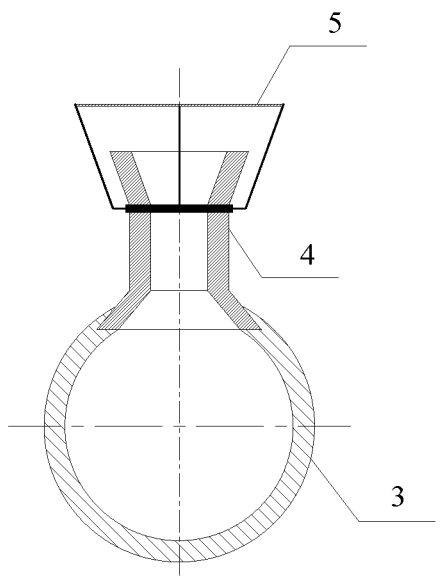
FIG. 3 is a schematic of the connecting structure between the Venturi distributor and the delta wing in the flue ozone distributor of the present invention.

FIGS. 1 through 3 show a flue ozone distributor, wherein the flue ozone distributor comprises a distribution main pipe 2, multiple distribution branch pipes 3, multiple Venturi distributors 4 and multiple delta wings 5; the multiple distribution branch pipes 3 are led out from the distribution main pipe 2 as parallel branches; the multiple Venturi distributors 4 are arranged with equal spacing on the distribution branch pipe 3; the delta wings 5 are arranged on one diffusion section side of the Venturi distributor 4.

The distribution branch pipe 3 is divided into two segments, the front distribution branch pipe 3-1 segment is led out from distribution main pipe 2 and is connected to the back distribution branch pipe 3-2 segment by a connecting flange 6; a control valve 7 is arranged on the distribution branch pipe 3-1, thus the amount of the introduced ozone may be adjusted depending on the concentration of NO in the flue gas. Spacing between the adjacent distribution branch pipes 3 is equal; spacing between the adjacent branch pipes 3 is 500 mm.

Selection of pipe diameters of the distribution main pipe 2 and the distribution branch pipe 3 is determined according to the gas velocity in the pipes. Gas velocity in the distribution main pipe 2 is 30 m/s; and gas velocity in the distribution branch pipe 3 is controlled to be 25 m/s.

Spacing between the adjacent Venturi distributors 4 is 100 mm.

The Venturi distributor 4 has a shrink angle of 90° and has a diffusion angle of 50°.

Ratio of height to diameter at the throat of the Venturi distributor 4 is 1.5; gas velocity at the throat of the Venturi distributor 4 is 12 m/s.

The vertical distance between the diffusion segment of the Venturi distributor 4 and the corresponding delta wing 5 is 12 cm; the delta wing 5 on the adjacent distributor branch pipes has a tilt angle of 90°. This design can increase the distribution region of the ozone, and strengthen the mixing effect of the ozone and the flue gas.

The delta wing 5 has a section of an equilateral triangle, of which a diameter of the inscribed circle is 1.5 times of the outlet diameter of the diffusion segment of the Venturi distributor 4.

The delta wing 5 and the Venturi distributor 4 are connected by a clamp which is integrated with the delta wing 5.

When the flue ozone distributor is arranged in the flue 1, the horizontal distance between the end of the distribution branch pipe 3 and side wall of the flue is of ½ width of the flue 1, an even number of groups of flue ozone distributors are symmetrically installed in dislocation on both sides of the flue 1; a direction of the ozone injected by the flue ozone distributor is consistent with a flow direction of the flue gas.

Example 3

This example is different from example 2 in that:
Spacing between the adjacent branch pipes 3 is 300 mm.

Gas velocity in the distribution main pipe 2 is 20 m/s; a gas velocity in the distribution branch pipe 3 is controlled to be 20 m/s.

Spacing between the adjacent Venturi distributors 4 is 50 mm.

The Venturi distributor 4 has a shrink angle of 70° and has a diffusion angle of 25°.

Ratio of height to diameter at the throat of the Venturi distributor 4 is 1.0; gas velocity at the throat of the Venturi distributor 4 is 8 m/s.

The vertical distance between the diffusion segment of the Venturi distributor and the corresponding delta wing is 8 cm.

The delta wing 5 has a section of an equilateral triangle, of which a diameter of the inscribed circle is 1.1 times of the outlet diameter of the diffusion segment of the Venturi distributor 4.

Example 4

This example is different from example 2 in that:
Spacing between the adjacent branch pipes 3 is 400 mm.

Gas velocity in the distribution main pipe 2 is 25 m/s; gas velocity in the distribution branch pipe 3 is controlled to be 20 m/s.

Spacing between the adjacent Venturi distributors 4 is 75 mm.

The Venturi distributor 4 has a shrink angle of 80° and has a diffusion angle of 40°.

Ratio of height to diameter at the throat of the Venturi distributor 4 is 1.2; gas velocity at the throat of the Venturi distributor 4 is 12 m/s.

The vertical distance between the diffusion segment of the Venturi distributor and the corresponding delta wing is 10 cm.

The delta wing 5 has a section of an equilateral triangle, of which a diameter of the inscribed circle is 1.2 times of the outlet diameter of the diffusion segment of the Venturi distributor 4.

Example 5

This example is different from example 2 in that:
Spacing between the adjacent branch pipes 3 is 400 mm.

Gas velocity in the distribution main pipe 2 is 27 m/s; gas velocity in the distribution branch pipe 3 is controlled to be 23 m/s.

Spacing between the adjacent Venturi distributors 4 is 80 mm.

The Venturi distributor 4 has a shrink angle of 75° and has a diffusion angle of 30°.

Ratio of height to diameter at the throat of the Venturi distributor 4 is 1.3; gas velocity at the throat of the Venturi distributor 4 is 10 m/s.

The vertical distance between the diffusion segment of the Venturi distributor and the corresponding delta wing is 11 cm.

The delta wing 5 has a section of an equilateral triangle, of which a diameter of the inscribed circle is 1.3 times of the outlet diameter of the diffusion segment of the Venturi distributor 4.

Example 6

Figure 4:
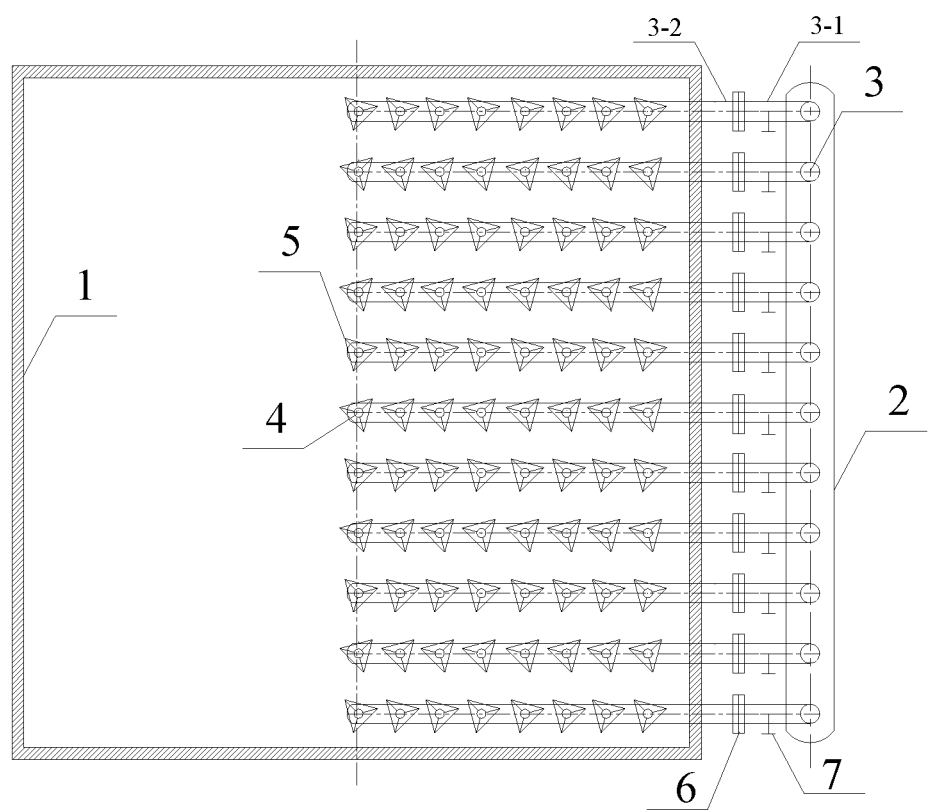
FIG. 4 is a schematic of the flue equipped with the flue ozone distributor of the present invention.
Figure 5:
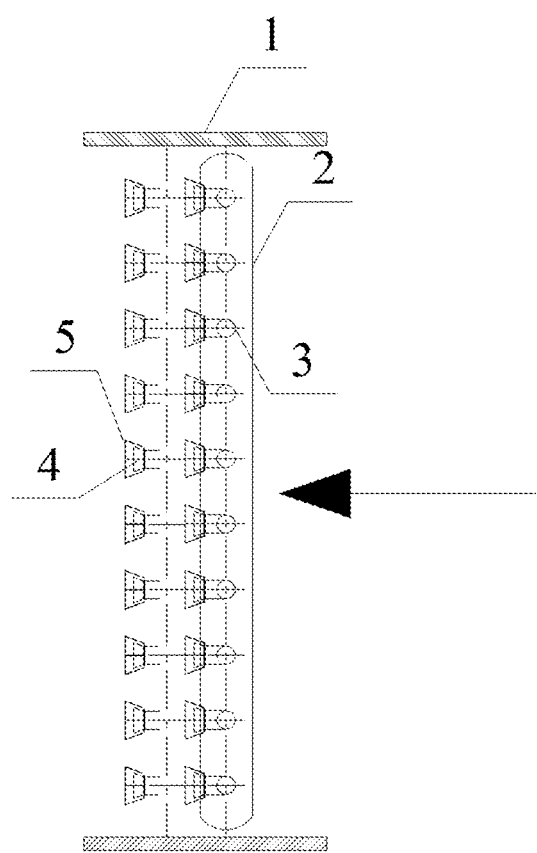
FIG. 5 is a side view schematic of the arrangement mode of two sets of the flue ozone distributors in the flue of the present invention.

FIG. 4 and FIG. 5 show a flue, wherein the flue ozone distributor of example 2 is arranged in the flue 1.

The horizontal distance between end of the distribution branch pipe 3 and side wall of the flue 1 is of ½ width of the flue 1; the pressure required by single ozone distributor is reduced while the distribution uniformity of the ozone in the flue is strengthened by employing an even number of groups of flue ozone distributors are symmetrically installed in dislocation on both sides of the flue 1. The injected direction of the ozone through the flue ozone distributor is consistent with flow direction of the flue gas. As such, a soot deposit congestion problem is avoided.

The working process of the present invention is as follows: the ozone generated from outside enters the distribution main pipe 2, enters the distribution branch pipe 3 after being adjusted by the control valve 7, and is injected into flue by the Venturi distributor 4, with the ozone injected direction being consistent with a flow direction of the flue gas. The injected ozone is subjected to flue gas turbulence by the delta wing 5 fixed on the front of the Venturi distributor 4, and is mixed and reacted thoroughly, then enters subsequent purification process.

The present invention is mainly applied in a field of denitrification for flue gas of an industrial boiler/kiln by low-temperature ozone oxidation method in industries such as pyroelectricity, steel and the like. An ozone injected direction is consistent with flow direction of the flue gas. A soot deposit congestion problem does not exist. A turbulent flow behavior of the flue gas and ozone is especially strengthened. The oxidation efficiency is improved. A flue distance of a valid reaction is shortened. An application advantage in an actual project is very obvious.

The present invention illustrates the detailed structural features and methods of the present invention by the above examples, but the present invention is not limited to the above detailed structural features and methods; that is, it does not mean that the invention must be conducted relying on the above detailed structural features and methods. Those skilled in the art should understand that any modification to the present invention, any equivalent replacement of parts selected by the present invention and the addition of auxiliary parts, the selection of specific mode and the like all fall into the protection scope and the disclosure scope of the present invention.

The preferred embodiments of the present invention is described above in detail, however, the present invention is not limited to the specific details of the above embodiments. Various simple modifications can be made to the technical solutions of the present invention within the technical spirit scope of the present invention, which all belong to the scope of the present invention.

Also, we need note that various specific technical features described in the above embodiments can be combined in any suitable manner without contradiction. Various possible combinations are no longer explained in the present invention in order to avoid unnecessary duplication.

In addition, various embodiments of the present invention also can be combined at will, as long as it is not contrary to the idea of the invention, and also should be regarded as the disclosure of the present invention.

The invention claimed is:

1. A flue ozone distributor comprising:
a flue; and
a distribution main pipe (2), multiple distribution branch pipes (3), multiple Venturi distributors (4) and multiple delta wings (5),
wherein the multiple distribution branch pipes (3) are led out from the distribution main pipe (2) as parallel branches, the multiple Venturi distributors (4) are arranged with an equal space with respect to each other on each of the distribution branch pipes (3) and the delta wings (5) are arranged on one diffusion segment side of the Venturi distributors (4), and
wherein the flue ozone distributor is arranged in the flue such that a horizontal distance between an end of each of the distribution branch pipes (3) and a side wall of the flue (1) is of ½ width of the flue (1), wherein an even number of groups of flue ozone distributors are symmetrically installed in dislocation on both sides of the flue (1) and the injected direction of the ozone through the flue ozone distributor is consistent with a flow direction of a flue gas.

2. The flue ozone distributor according to claim 1, wherein each of the distribution branch pipes (3) is divided into two segments, a front distribution branch pipe (3-1) segment is led out from the distribution main pipe (2) and is connected to a back distribution branch pipe (3-2) segment through a connecting flange (6).

3. The flue ozone distributor according to claim 1, wherein a control valve (7) is arranged on the front distribution branch pipe (3-1).

4. The flue ozone distributor according to claim 1, wherein spacing between adjacent distribution branch pipes (3) is equal.

5. The flue ozone distributor according to claim 1, wherein spacing between adjacent distribution branch pipes (3) is 300-500 mm.

6. The flue ozone distributor according to claim 1, wherein gas velocity in the distribution main pipe (2) is not greater than 30 m/s.

7. The flue ozone distributor according to claim 1, wherein gas velocity in the distribution branch pipes (3) is controlled to be 20-25 m/s.

8. The flue ozone distributor according to claim 1, wherein spacing between adjacent Venturi distributors (4) is 50-100 mm.

9. The flue ozone distributor according to claim 1, wherein each of the Venturi distributors (4) has a shrink angle of 70-90°.

10. The flue ozone distributor according to claim 1, wherein each of the Venturi distributors (4) has a diffusion angle of 25-50°.

11. The flue ozone distributor according to claim 1, wherein the ratio of height to diameter at the throat of each of the Venturi distributors (4) is 1.0-1.5.

12. The flue ozone distributor according to claim 1, wherein gas velocity at the throat of each of the Venturi distributors (4) is 8-12 m/s.

13. The flue ozone distributor according to claim 1, wherein the vertical distance between the diffusion segment of each of the Venturi distributors (4) and the corresponding delta wing (5) is 8-12 cm.

14. The flue ozone distributor according to claim 1, wherein the delta wing (5) on adjacent distributor branch pipes has a tilt angle of 90°.

15. The flue ozone distributor according to claim 1, wherein each of the delta wings (5) has a section of an equilateral triangle, of which a diameter of the inscribed circle is 1.1-1.5 times of the outlet diameter of the diffusion segment of each of the Venturi distributors (4).

\* \* \* \* \*